United States Patent [19]
Beroth

[11] Patent Number: 5,154,374
[45] Date of Patent: Oct. 13, 1992

[54] AIRCRAFT PASSENGER SEAT ASSEMBLY INCLUDING AN EMERGENCY OXYGEN SYSTEM

[75] Inventor: Michael T. Beroth, Lewisville, N.C.

[73] Assignee: Burns Aerospace Corportion, Winston-Salem, N.C.

[21] Appl. No.: 748,974

[22] Filed: Aug. 23, 1991

[51] Int. Cl.⁵ .............................................. B64D 13/00
[52] U.S. Cl. .................................. 244/118.5; 244/141
[58] Field of Search ............... 244/118.5, 141, 122 A, 244/140; 128/202.13, 204.18, 204.24, 205.25, 206.27; 169/62, 84, 88

[56] References Cited

U.S. PATENT DOCUMENTS 4,481,945 11/1984 Levine ............................... 244/118.5
4,609,166 9/1986 Brennan ............................. 244/141

Primary Examiner—Joseph F. Peters, Jr.
Assistant Examiner—Anne E. Bidwell
Attorney, Agent, or Firm—W. Thad Adams, III

[57] ABSTRACT

An aircraft passenger seat assembly, including an emergency oxygen system, a seat frame, seat bottom and seat back, and respective cushions for the seat bottom and seat back. A chemical reaction oxygen generating canister is positioned in the seat bottom below the seat bottom cushion. Oxyen flow conduit interconnect the oxygen canister and an oxygen mask compartment. A cable is operatively connected by a first end to the firing pin mechanism of the oxygen generating canister and extends from the firing pin mechanism to the mask compartment. A lever arm is positioned in the oxygen mask compartment to which a second end of the cable is attached. Another lever also includes a tether releasably connected to the lever arm and to a mask. The lever arms are mounted in the mask compartment for pivotal movement between a non-activated position and an activated position in which the cable activates the firing pin mechanism of the oxygen canister and the mask is released from a storage position into a use position for use by the passenger.

10 Claims, 10 Drawing Sheets

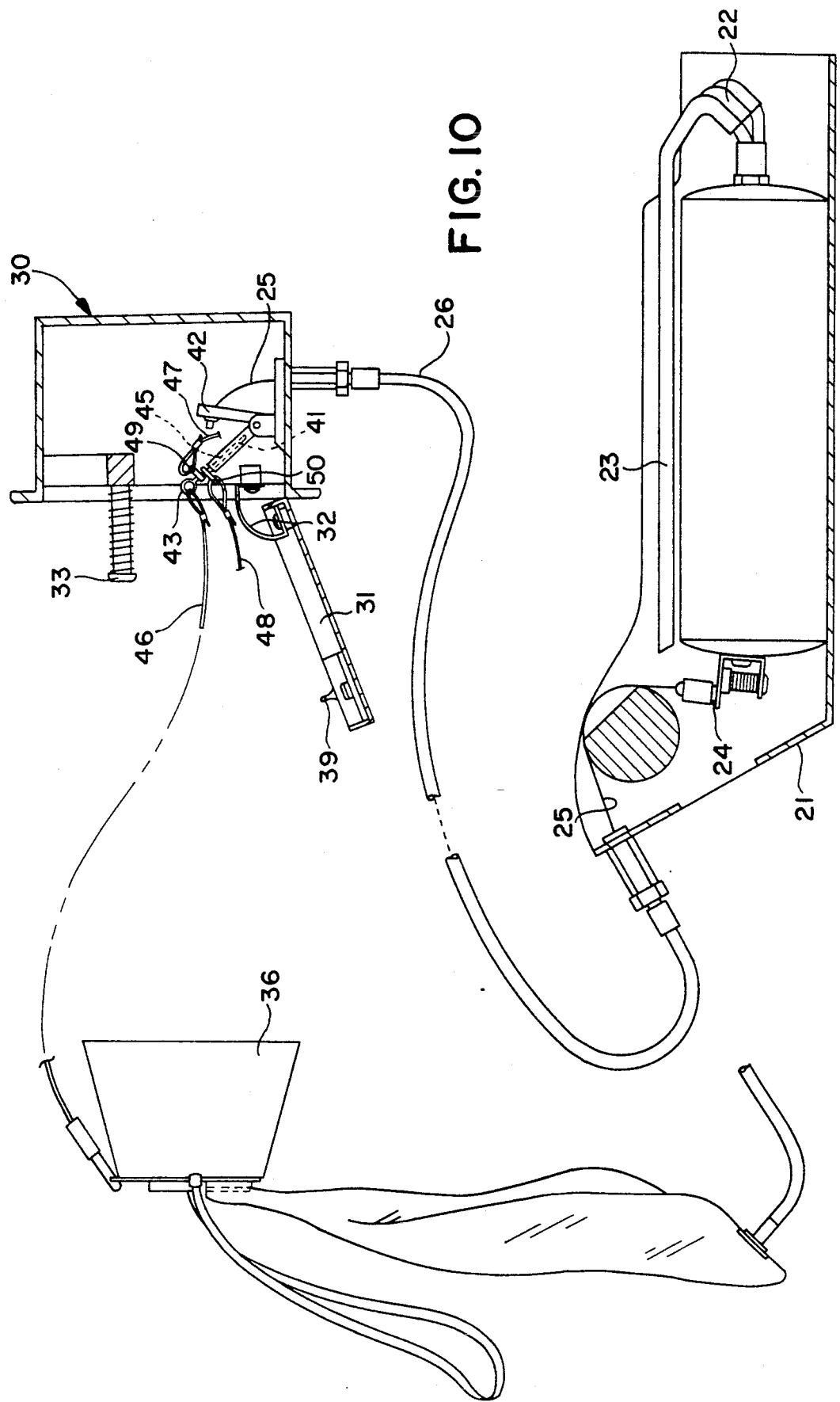

_5,154,374_

AIRCRAFT PASSENGER SEAT ASSEMBLY INCLUDING AN EMERGENCY OXYGEN SYSTEM

TECHNICAL FIELD AND BACKGROUND OF THE INVENTION

This invention relates to a an aircraft passenger seat assembly which includes an emergency oxygen system, and the subcombination of a supplemental emergency oxygen system for aircraft passenger seats. Such an emergency system is required equipment for all high-altitude commercial aircraft. The system is in a non-activated state so long as the pressurization equipment of the aircraft is functioning properly, and the cabin altitude is maintained at the proper level. Upon decompression, a compartment door opens, exposing emergency oxygen masks which are taken by the passengers and placed over the mouth and nose. Pulling the mask to the face activates the firing pin of a chemical reaction oxygen generating canister, causing oxygen to flow to the mask. Most systems have the masks stored in an overhead compartment behind a normally-locked door. Decompression causes the door to unlock and the masks fall free into a position generally in front of and within reach of the passengers.

The invention disclosed and claimed in this application has particular application for use in aircraft seats intended for DC-10 aircraft. The masks are stored in a compartment in the upper back of the passenger seat above the seat-back tray table. Generally, one compartment is provided for every three passengers, with three masks being positioned in each compartment.

U.S. Pat. No. 4,609,166 discloses an emergency oxygen system for aircraft wherein the oxygen canister is mounted in the seat frame of the seat in front of the passengers who will use the masks to which the canister supplies oxygen. The masks are positioned in normally-locked compartments in the seat back. A cable is loaded by a powerful spring and locked in the loaded position by a locking pin. When one of the masks is pulled free of the compartment, the locking pin is pulled from a releasing mechanism, releasing the spring, which jerks the cable connected to the firing pin of the oxygen canister, which in turn pulls a locking pin free and releases the firing pin, thus starting the reaction which generates oxygen.

The mechanism disclosed in the '166 Patent relies on the power stored in the spring to pull the locking pin out of the firing pin. Three separate connected movements are required--the pull of the tether which pulls the locking pin from the release mechanism in the compartment, the release of the spring which jerks the cable, and the pull of the locking pin from the firing pin of the oxygen canister. Any malfunction in the spring, for example, foreign matter trapped in the spring or wedged against the release mechanism, could cause the device to malfunction. Three separate movements must be performed correctly.

The invention disclosed in this application simplifies the procedure by directly connecting the pull of the tether which release the mask to the pull of the locking pin from the firing pin of the oxygen canister.

SUMMARY OF THE INVENTION

Therefore, it is an object of the invention to provide an aircraft passenger seat assembly which includes an emergency oxygen system.

It is another object of the invention to provide a supplemental emergency oxygen system for aircraft passenger seats.

It is another object of the invention to provide an emergency oxygen system which has a simplified release mechanism.

It is another object of the invention to provide an emergency oxygen system which has an efficient means of conveying oxygen from the position of the oxygen generating to the mask position.

It is another object of the invention to provide an emergency oxygen system which directly utilizes the force used to release the masks from the mask compartment to activate the oxygen canister.

These and other objects of the present invention are achieved in the preferred embodiments disclosed below by providing an aircraft passenger seat assembly, including an emergency oxygen system, a seat frame, seat bottom and seat back, and respective cushions for the seat bottom and seat back. A chemical reaction oxygen generating canister is positioned in the seat bottom below the seat bottom cushion. The oxygen generating canister includes a firing pin mechanism for activating the chemical reaction which generates oxygen. An oxygen mask compartment is positioned in a rear-facing side of the seat back for containing at least one oxygen mask for use by a passenger seated behind the seat assembly.

Oxygen flow conduit means interconnect the oxygen canister and the oxygen mask compartment. Cable means are operatively connected by a first end to the firing pin mechanism of the oxygen generating canister and extend from the firing pin mechanism to the mask compartment. Lever arm means are positioned in the oxygen mask compartment to which a second end of the cable means is attached. The lever means also include tether means releasably connected by a first end thereof to the lever arm means and connected by a second end thereof to the mask. The lever arm means are mounted in the mask compartment for pivotal movement between a non-activated position and an activated position in which the cable means activates the firing pin mechanism of the oxygen canister and the mask is released from a storage position into a use position for use by the passenger.

According to one preferred embodiment of the invention, the lever arm means comprise a base mounted in the mask compartment, a pivot assembly carried by the base, a first lever arm mounted for pivotal movement on the pivot assembly with the cable means connected thereto and a second lever arm mounted for pivotal movement on the pivot assembly in radially-spaced relation to the first lever arm and releasably carrying the tether means.

According to another preferred embodiment of the invention, the second lever arm includes a tether release pin hole therein. The tether means includes a tether release pin for being releasably positioned in the tether release pin hole, the second lever arm being positioned on the base whereby in the non-activated position the tether release pin is retained therein and in the activated position the tether release pin is released from the tether release pin hole, thereby releasing the mask.

According to yet another preferred embodiment of the invention, the mask compartment includes three masks; two of the masks having a tether having a respective tether ring on one end thereof and the third mask has the tether release pin thereon, the tether rings adapted for being fitted over and received onto the tether release pin whereby movement of any one of the three masks pulls the lever means forward activating the oxygen canister and releasing all of the masks for use.

According to one preferred embodiment of the invention, the oxygen flow conduit means comprises a three-to-one manifold connected to the oxygen discharge end of the oxygen canister, a single oxygen flow conduit extending from the three-to-one manifold to the mask compartment and a one-to-three manifold positioned in the mask compartment. First, second and third oxygen flow tubes interconnect the one-to-three manifold and respective first, second and third masks.

According to another preferred embodiment of the invention, an emergency oxygen system for an aircraft passenger seat assembly comprises a chemical reaction oxygen generating canister for being positioned in a seat bottom of an aircraft passenger seat below a seat bottom cushion, the oxygen generating canister including a firing pin mechanism for activating the chemical reaction which generates oxygen. An oxygen mask compartment is provided for being positioned in a rear-facing side of a seat back of the passenger seat assembly for containing at least one oxygen mask for use by a passenger seated behind the seat assembly, oxygen flow conduit means interconnect the oxygen canister and the oxygen mask compartment. Cable means are operatively connected by a first end to the firing pin mechanism of the oxygen generating canister and extend from the firing pin mechanism to the mask compartment. Lever arm means are positioned in the oxygen mask compartment to which a second end of the cable means is attached. The lever means also includes tether means releasably connected by a first end thereof to the lever arm means and connected by a second end thereof to the mask.

The lever arm means are mounted in the mask compartment for pivotal movement between a non-activated position and an activated position in which the cable means activates the firing pin mechanism of the oxygen canister and the mask is released from a storage position into a use position for use by the passenger.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 10 is an enlarged fragmentary schematic view with parts rearranged to illustrate operation of the firing pin release portion of the system.

DESCRIPTION OF THE PREFERRED EMBODIMENT AND BEST MODE

Figure 1:
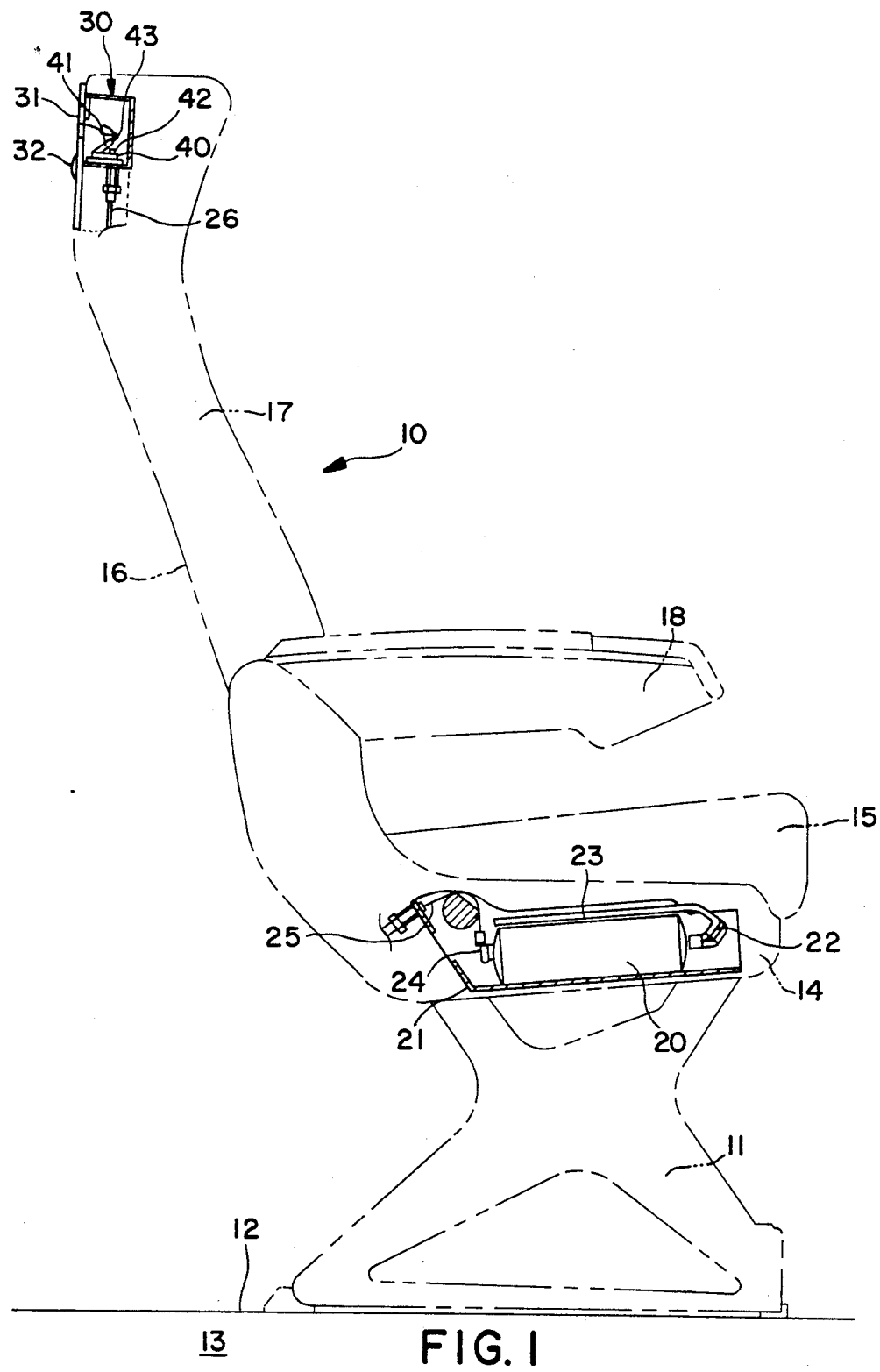
FIG. 1 is a fragmentary side elevation of an aircraft passenger seat according to an embodiment of the invention.

Referring now specifically to the drawings, an aircraft passenger seat according to the present invention is illustrated in FIG. 1 and shown generally at reference numeral 10. Seat 10 includes legs 11 which are secured to tracks 12 in the floor 13 of the aircraft. The legs 11 support a seat chassis which includes a seat bottom 14 and an overlying seat bottom cushion 15. A seat back 16 is mounted for limited pivotal movement to the seat bottom 14, and is covered on its front side with a back seat cushion 17. An armrest 18 is provided for passenger comfort.

In accordance with an embodiment of the invention, a conventional chemical reaction oxygen generating canister 20 is positioned in the seat bottom 14 below the seat bottom cushion 15. Canister 20 is supported by a metal pan 21, and is positioned below the lower extent or plane of the seat bottom cushion 15.

The forward end of the canister 20 is attached to a three-to-one manifold 22 and oxygen flow tube 23. The rear end of the canister 20 includes a firing pin assembly 24. Friction created by a powerful blow from a spring-loaded metal pin against a metal strike plate generates sufficient heat to ignite the chemicals within the canister 20. The firing pin assembly 24 is activated by the pulling action of a release cable 25 extending within a tubular cable shield 26 which withdraws a locking pin from the firing pin assembly 24. The reaction of the burning chemicals within the canister 20 generates oxygen. The reaction is not reversible. The reaction continues within the canister 20 until the chemicals are exhausted.

Figure 2:
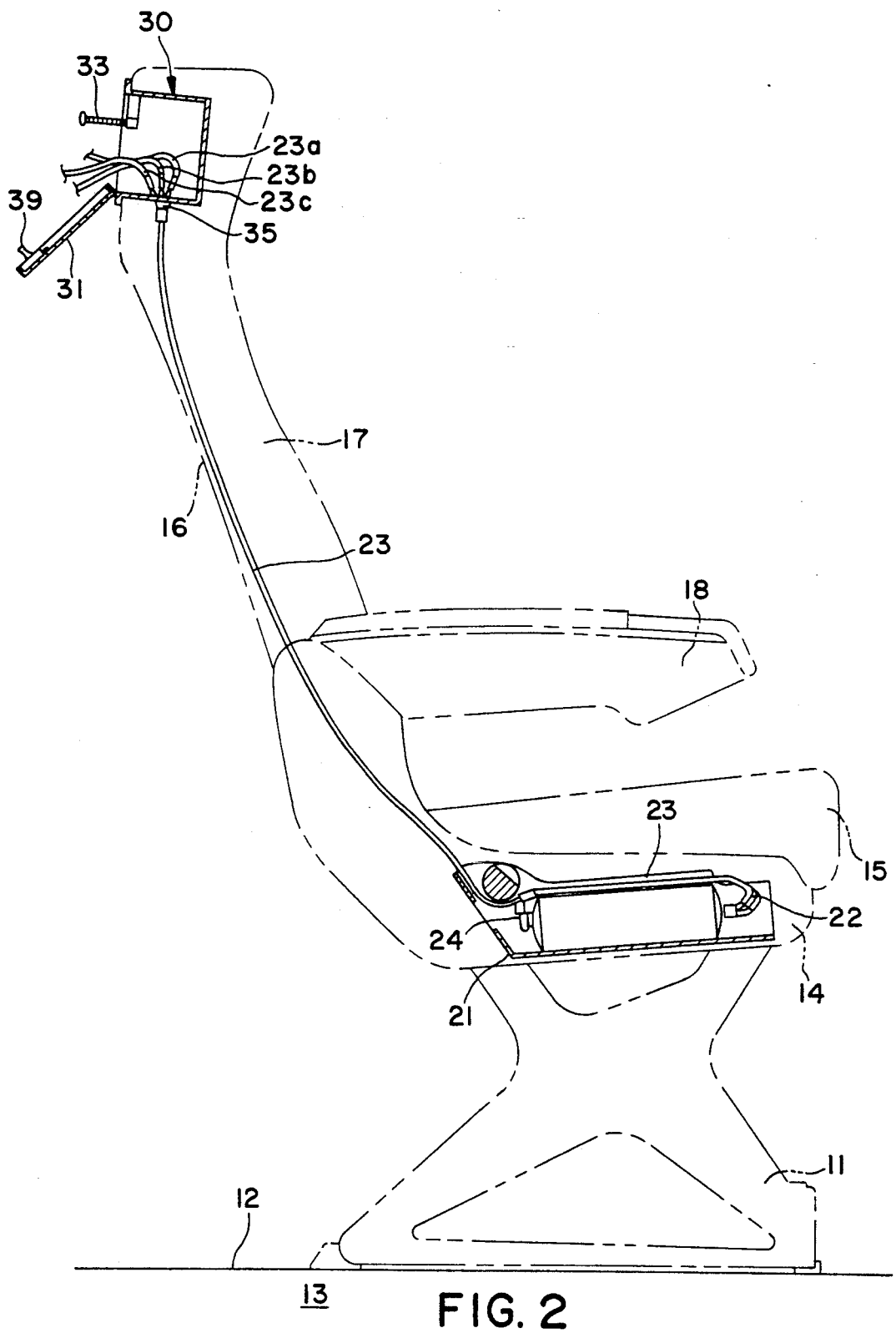
FIG. 2 is a fragmentary side elevation of an aircraft passenger seat according to FIG. 1, showing the means for conveying oxygen to from the oxygen canister to the mask compartment.
Figure 3:
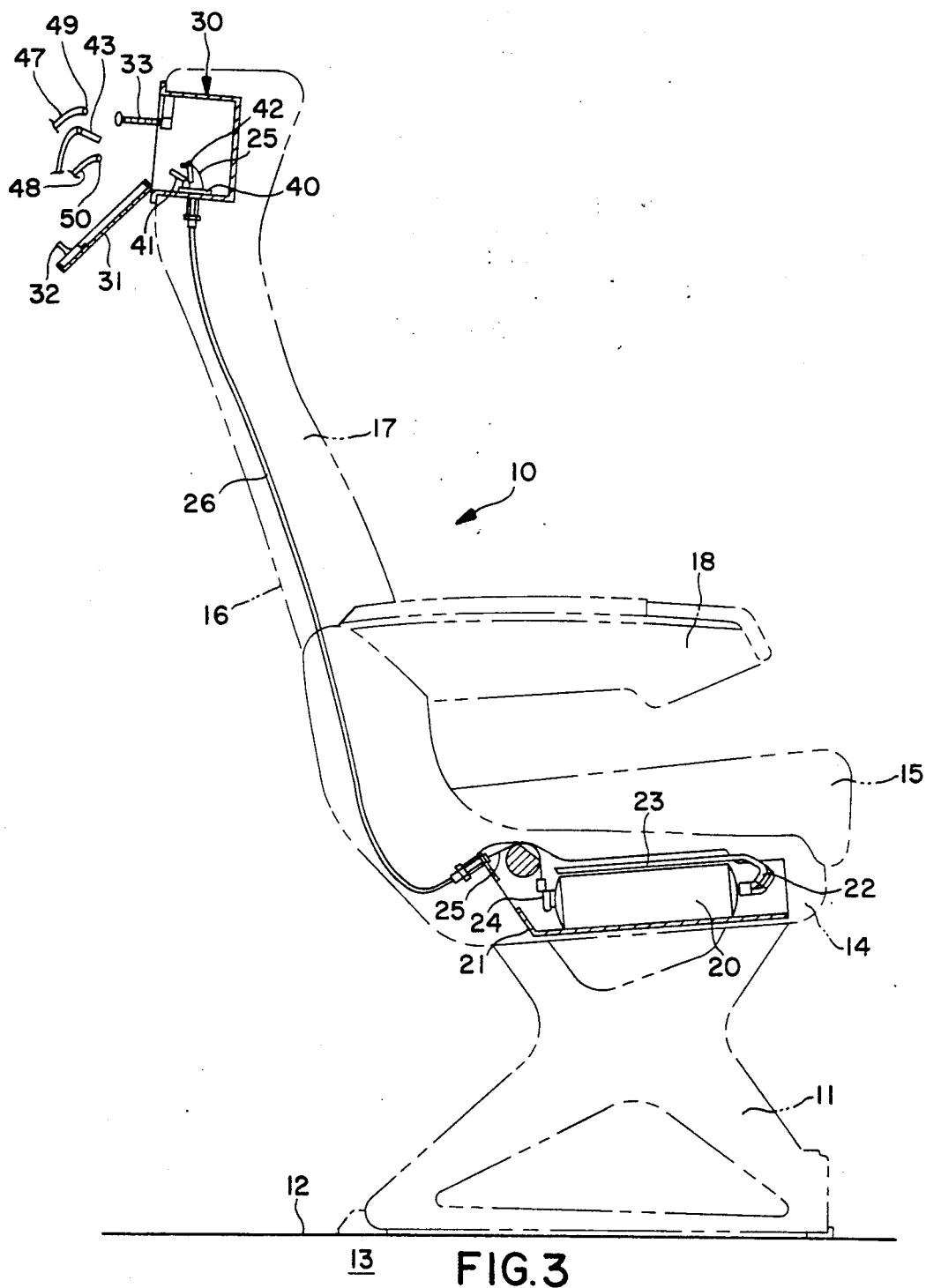
FIG. 3 is a fragmentary side elevation of an aircraft passenger seat according to FIG. 1, showing the means for activating the firing pin of the oxygen canister.
Figure 4:
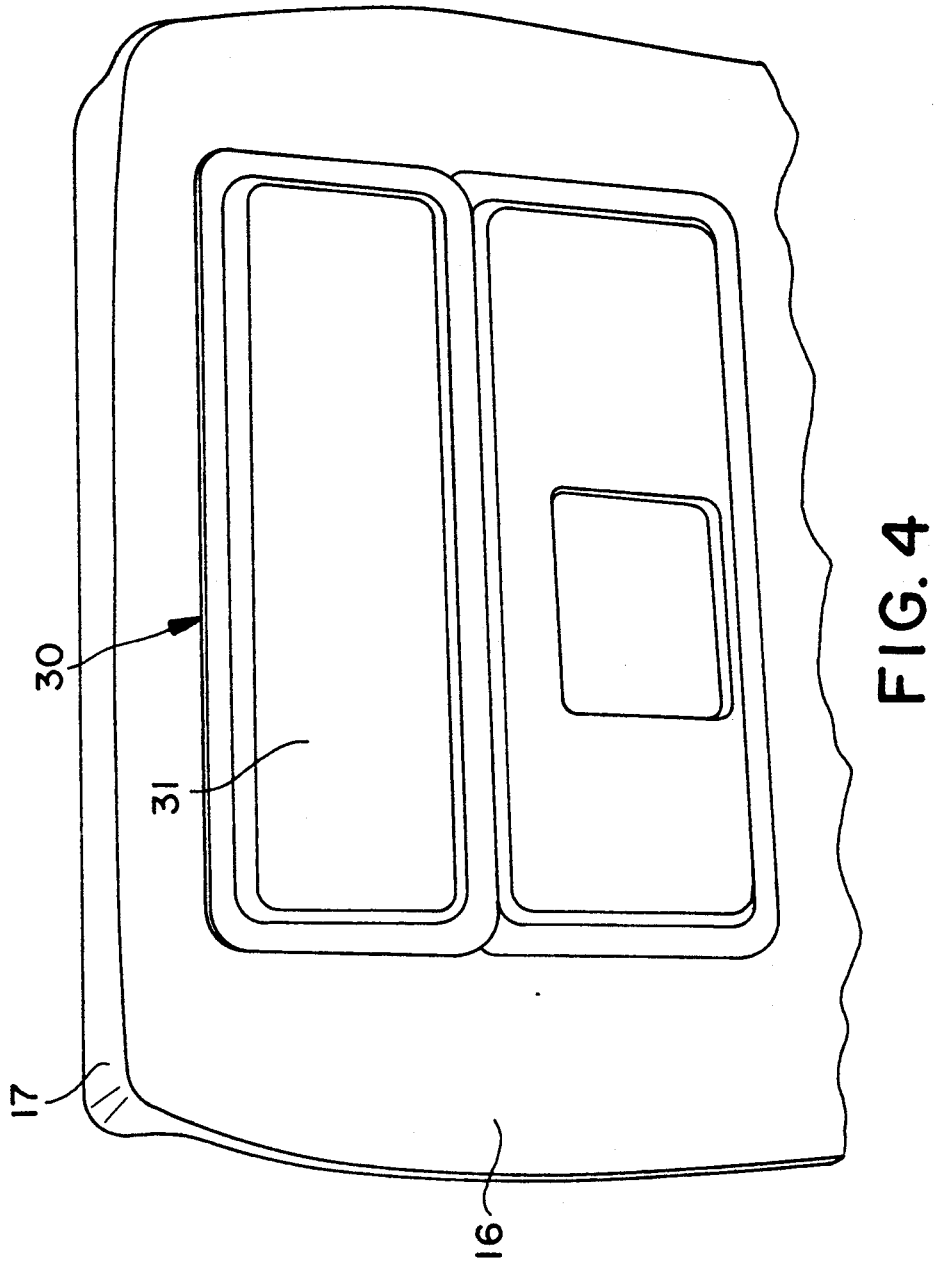
FIG. 4 is an enlarged fragmentary perspective view of the upper rear-facing part of a seat back showing the mask compartment in its normal, closed position.

As is best shown in FIGS. 2 and 4, a mask compartment 30 is positioned in a suitably-sized recess in the upper rear-facing portion of seat 10. Mask compartment 30 is normally closed by a door 31 (FIG. 1) which is hinged along the bottom edge by flexible hinges 32 (FIGS. 1, 2, 3 and 5).

Figure 5:
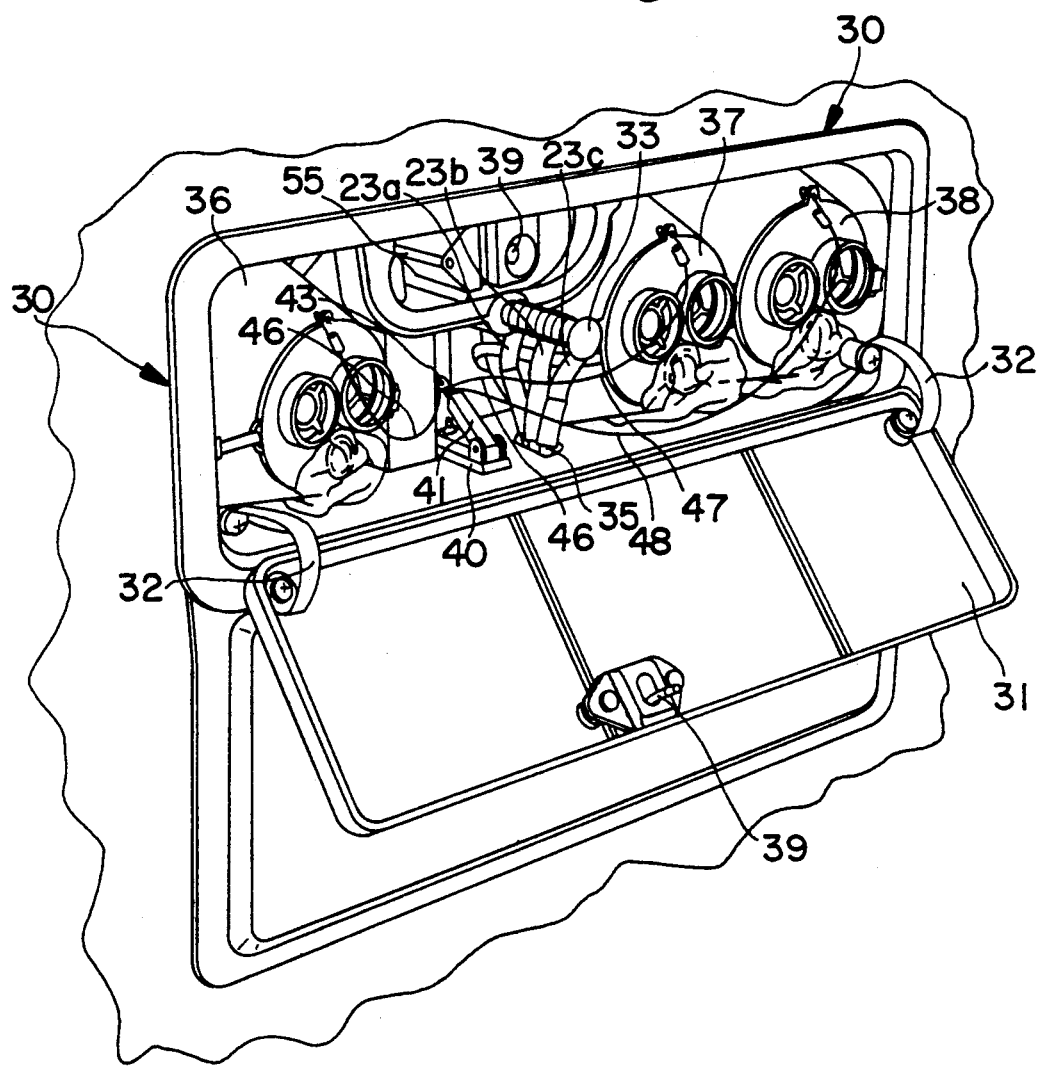
FIG. 5 is an enlarged fragmentary perspective view of the upper rear-facing part of a seat back showing the mask compartment in its initial open position.

As is best shown in FIG. 5, door 31 is normally latched in a closed positioned by a door latch assembly 39. The door is normally latched and is released only upon a sudden decompression within the aircraft cabin which activates a main pressure sensor (not shown) which in turns relays a signal to each mask compartment 30. A solenoid 55 releases the latch assembly 39 and also a spring-loaded plunger 33 which moves outwardly against the door 31, forcing it very rapidly into the open position. FIG. 3. The design of the device is intended to insure that the door 31, which may go for years without actually being used in a decompression incident, is positively moved into a position where the masks are readily accessible by the passengers.

Figure 9:
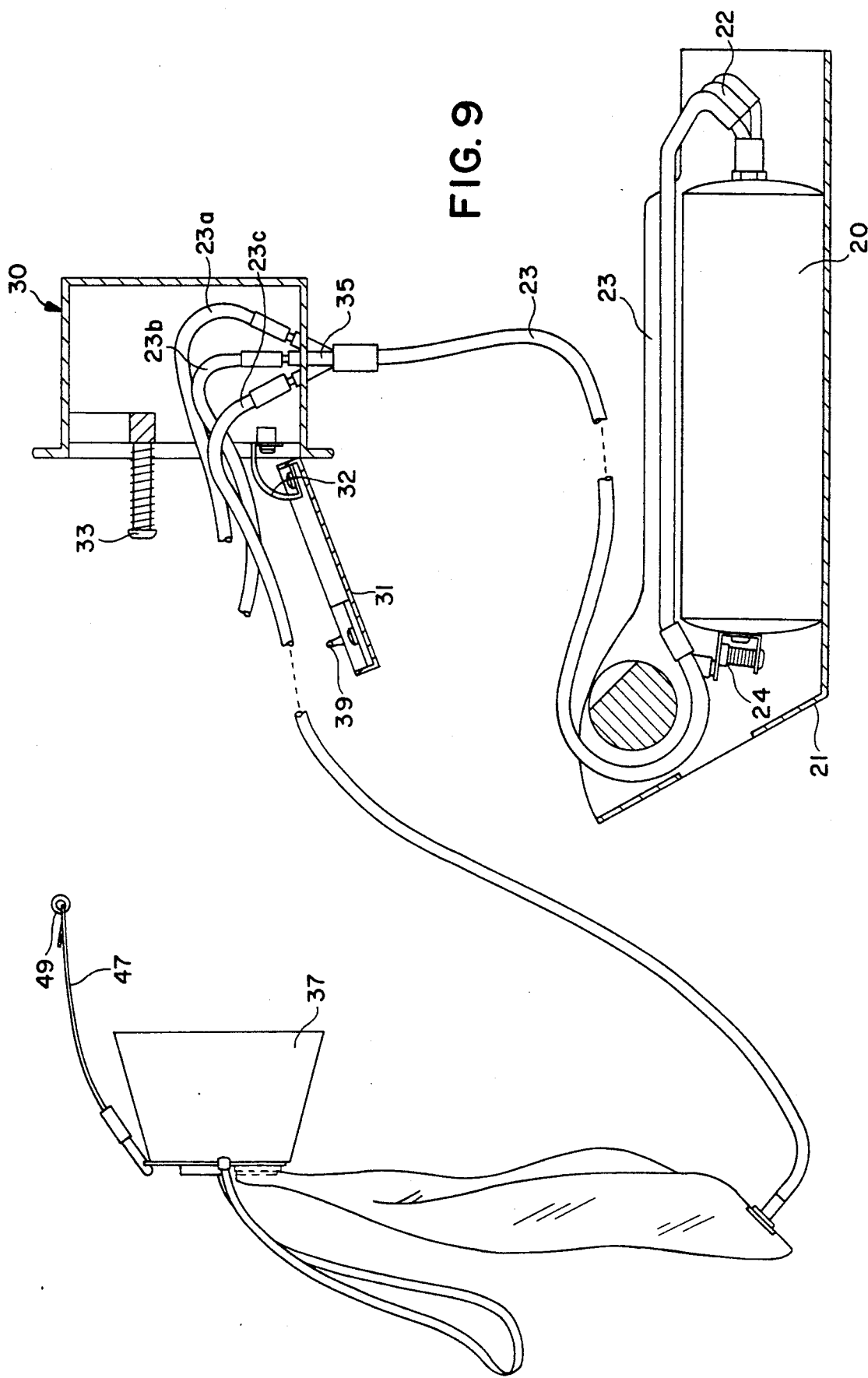
FIG. 9 is an enlarged fragmentary schematic view with parts rearranged to illustrate operation of the oxygen flow portion of the system.

As is shown in FIGS. 2 and 9, the oxygen flow tube 23 terminates in a manifold fitting 35 in the bottom wall of mask compartment 30, where three oxygen flow tubes 23a, 23b, and 23c connect to the manifold fitting. As is shown in FIG. 5, oxygen flow tubes 23a, 23b, and 23c supply oxygen to three masks 36, 37 and 38.

As is shown in FIG. 1, release cable 25 terminates in a lever arm assembly 40. In its normal position, as is shown in FIG. 1, lever arms 41 and 42 are mounted for pivotal movement in a first position, with lever arm 41 directed toward the front of seat back 16 and away from the passengers seated behind the seat 10. A release pin 43 is positioned in a hole 45 in and extending along the length of lever arm 41, as is best shown in FIG. 10. Release pin 43 is connected to a tether 46 which in turn is attached to one of the masks, for example mask 36. The other two masks 37 and 38 are attached by respective tethers 47 and 48 which have small rings 49 and 50 attached to the other ends. These rings 47 and 48 are slipped over the release pin 43 before the release pin 43 is placed in hole 45.

Figure 6:
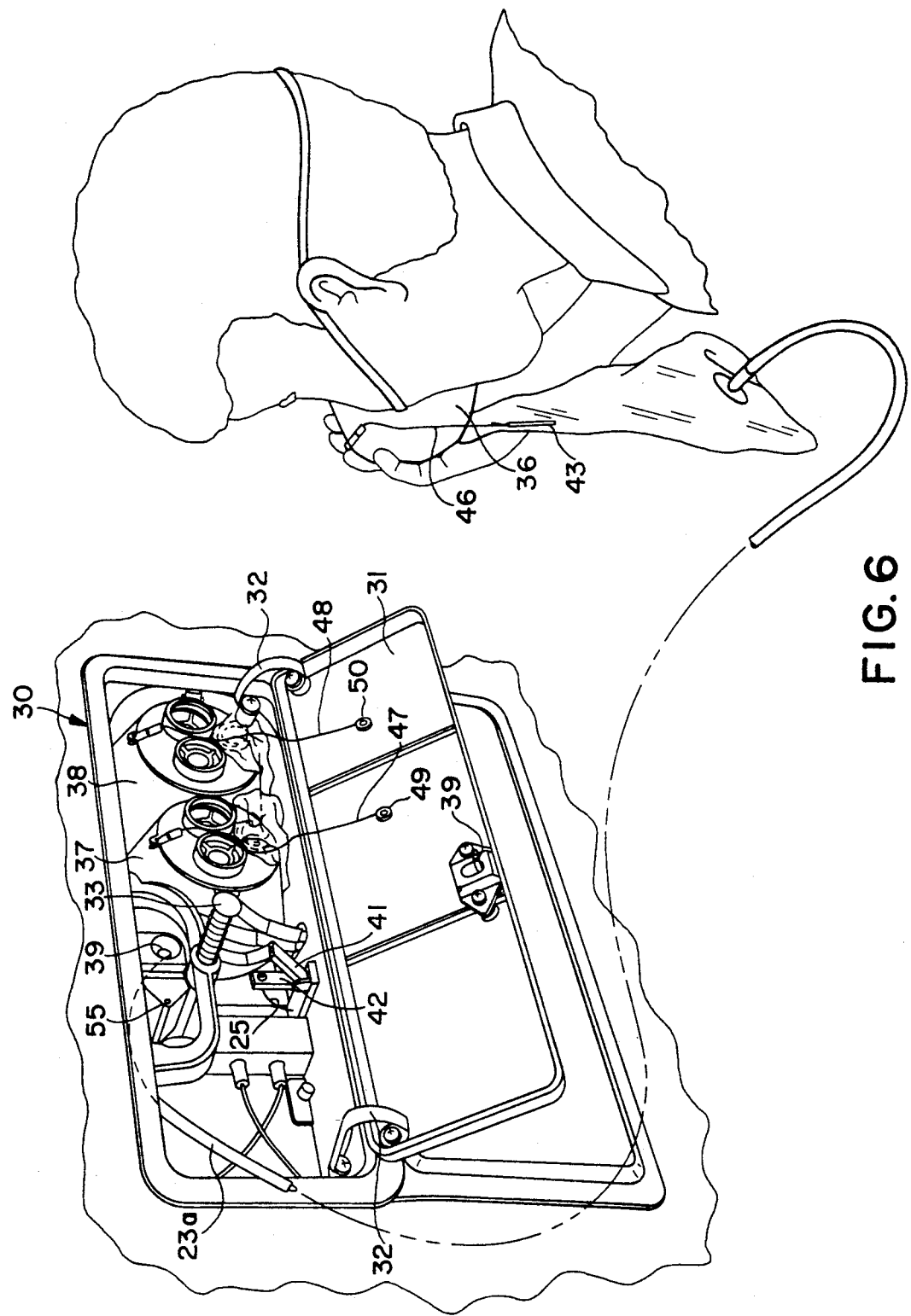
FIG. 6 is an enlarged fragmentary perspective view of the upper rear-facing part of a seat back showing the mask compartment in its open position during use.
Figure 7:
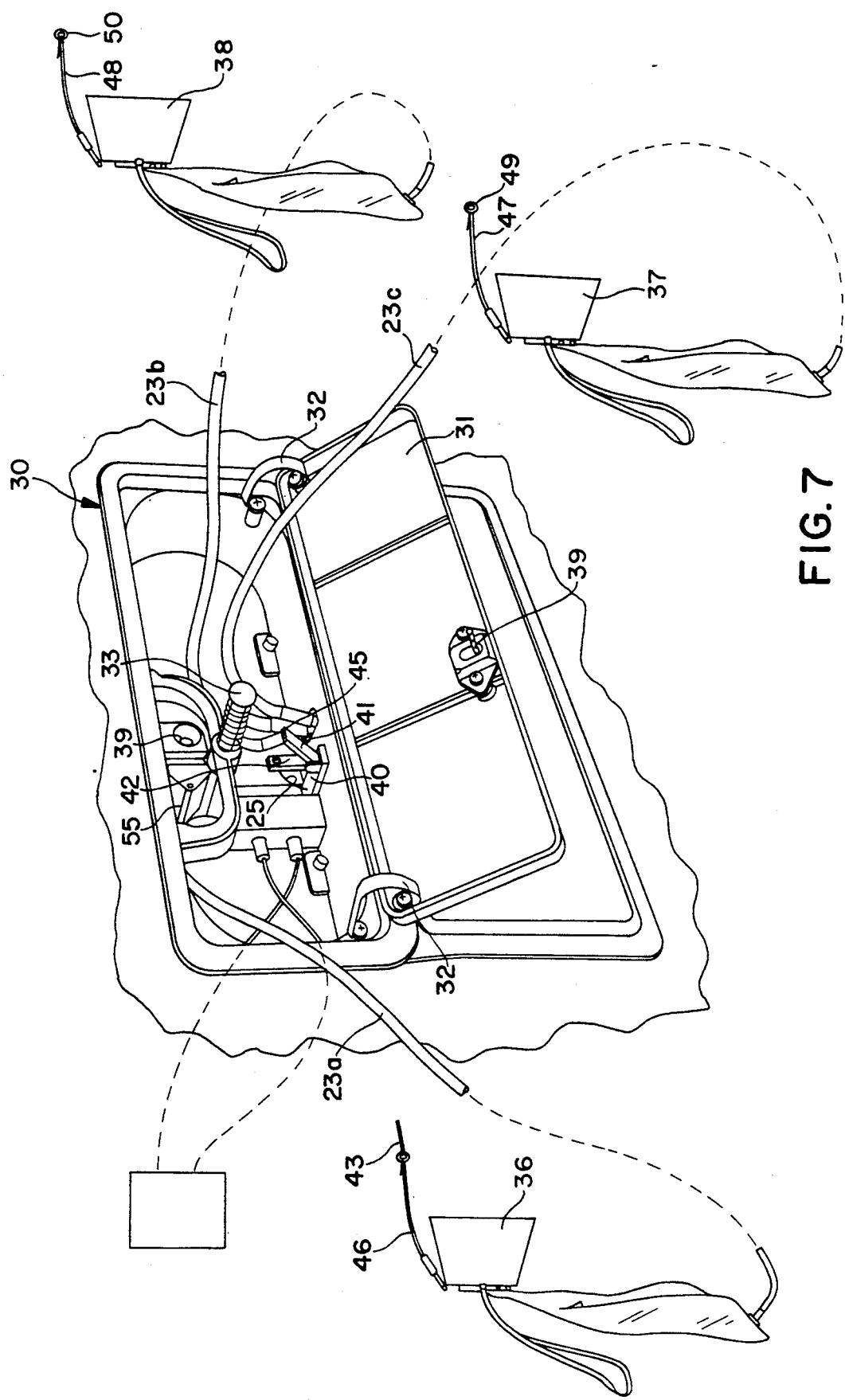
FIG. 7 is an enlarged fragmentary perspective view of the upper rear-facing part of a seat back showing the mask compartment in its open position during use, and illustrating that a pull on any of the three masks activates the flow of oxygen.
Figure 8:
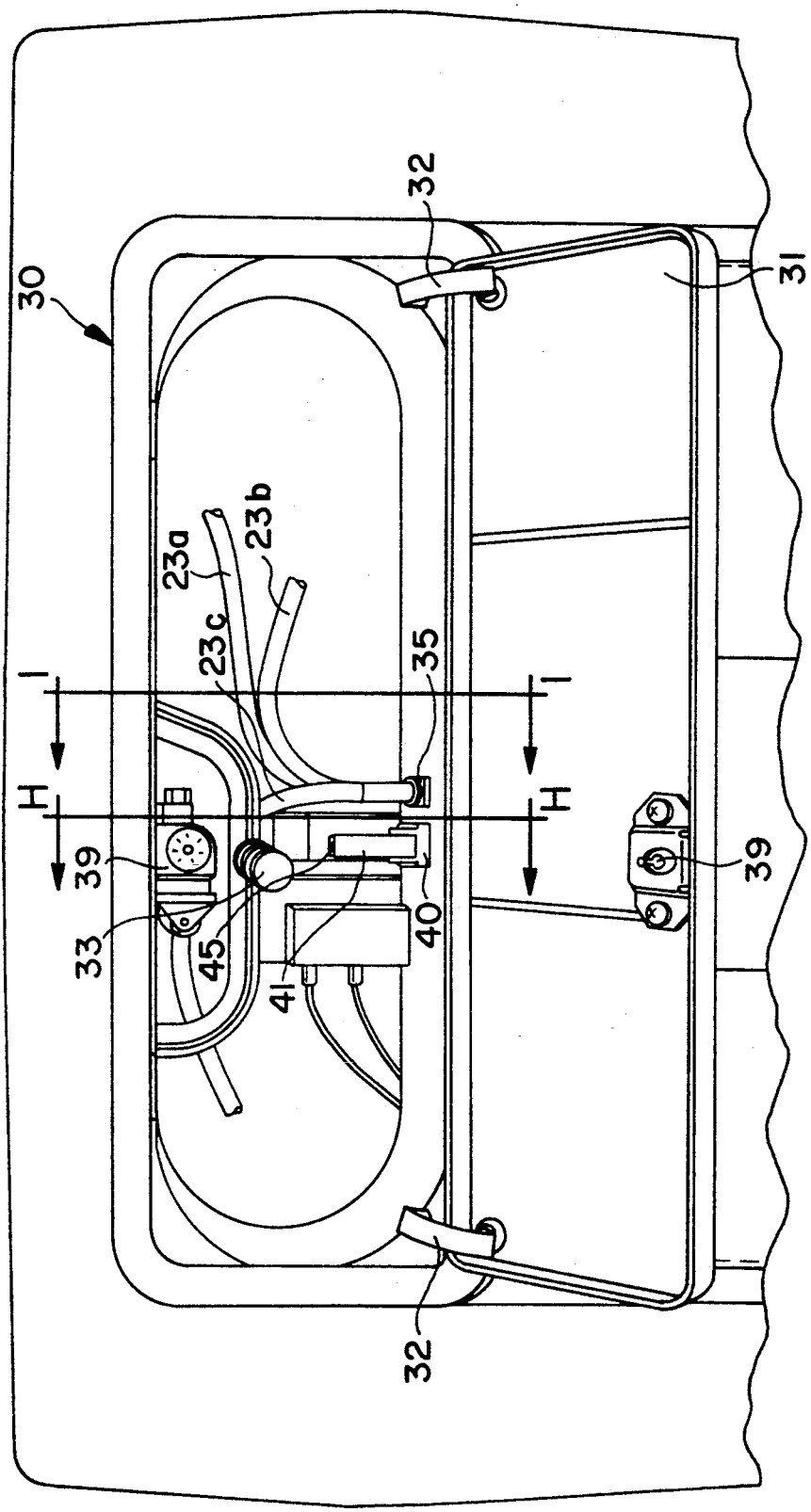
FIG. 8 is an elevation of the mask compartment with the masks removed for clarity.

As is best shown in FIGS. 6 and 10, when a passenger grasps any one of the masks 36, 37 or 38 and pulls it out of the mask compartment 30 into a use position, the release pin 43 is pulled toward the passenger. The angle of the lever arm 41, as described above, provides a mechanical advantage which with very little force (about 5 pounds) causes the release pin 43 to pull the lever arm 41 forward. As this happens the lever arm 42 is also pivoted forward. FIGS. 7 and 8. The release cable 25 connected to lever arm 42 is pulled upwardly, withdrawing the locking pin from the firing pin assembly 24. Thus, if any single mask 36, 37 or 38 is pulled from the mask compartment, as is shown in FIG. 6, release pin 43 is pulled from lever arm 41, simultaneously releasing the masks for use and activating the flow of oxygen from oxygen canister 20.

This construction permits the pulling force on the masks to directly release the masks and activate the flow of oxygen, thereby eliminating the necessity of maintaining a continually loaded, powerful spring which pulls the firing pin from the oxygen canister.

An aircraft passenger seat assembly which includes an emergency oxygen system is described above. Various details of the invention may be changed without departing from its scope. Furthermore, the foregoing description of the preferred embodiment of the invention and the best mode for practicing the invention are provided for the purpose of illustration only and not for the purpose of limitation--the invention being defined by the claims.

I claim:

1. An aircraft passenger seat assembly, including an emergency oxygen system, and comprising:
    (a) a seat frame, seat bottom and seat back, and respective cushions for the seat bottom and seat back;
    (b) a chemical reaction oxygen generating canister positioned in the seat bottom below the seat bottom cushion, said oxygen generating canister including a firing pin mechanism for activating the chemical reaction which generates oxygen;
    (c) an oxygen mask compartment positioned in a rear-facing side of the seat back for containing at least one oxygen mask for use by a passenger seated behind the seat assembly;
    (d) oxygen flow conduit means interconnecting said oxygen canister and said oxygen mask compartment;
    (e) cable means operatively connected by a first end to said firing pin mechanism of said oxygen generating canister and extending from said firing pin mechanism to said mask compartment; and
    (f) lever arm means positioned in said oxygen mask compartment to which a second end of said cable means is attached; said lever means also including tether means releasably connected by a first end thereof to said lever arm means and connected by a second end thereof to said mask, said lever arm means mounted in said mask compartment for pivotal movement between a non-activated position and an activated position in which the cable means activates the firing pin mechanism of the oxygen canister and the mask is released from a storage position into a use position for use by the passenger.

2. An aircraft passenger seat assembly according to claim 1, wherein said lever arm means comprises:
    (a) a base mounted in said mask compartment;
    (b) a pivot assembly carried by said base;
    (c) a first lever arm mounted for pivotal movement on said pivot assembly with said cable means connected thereto; and
    (d) a second lever arm mounted for pivotal movement on said pivot assembly in radially-spaced relation to said first lever arm and releasably carrying said tether means.

3. An aircraft passenger seat assembly according to claim 2, wherein said second lever arm includes a tether release pin hole therein, and said tether means includes a tether release pin for being releasably positioned in said tether release pin hole, said second lever arm being positioned on said base whereby in said non-activated position said tether release pin is retained therein and in said activated position said tether release pin is released from said tether release pin hole, thereby releasing the mask.

4. An aircraft passenger seat assembly according to claim 3, wherein said mask compartment includes three masks; two of said masks having a tether having a respective tether ring on one end thereof and said third mask has said tether release pin thereon, said tether rings adapted for being fitted over and received onto said tether release pin whereby movement of any one of the three masks pulls the lever means forward activating the oxygen canister and releasing all of the masks for use.

5. An aircraft passenger seat assembly according to claim 4, wherein said oxygen flow conduit means comprises:
    (a) a three-to-one manifold connected to the oxygen discharge end of said oxygen canister;
    (b) a single oxygen flow conduit extending from said three-to-one manifold to said mask compartment; and
    (c) a one-to-three manifold positioned in said mask compartment, and first, second and third oxygen flow tubes interconnecting said one-to-three manifold and respective first, second and third masks.

6. An emergency oxygen system for an aircraft passenger seat assembly and comprising:
    (a) a chemical reaction oxygen generating canister for being positioned in a seat bottom of an aircraft passenger seat below a seat bottom cushion, said oxygen generating canister including a firing pin mechanism for activating the chemical reaction which generates oxygen;

(c) an oxygen mask compartment for being positioned in a rear-facing side of a seat back of the passenger seat assembly for containing at least one oxygen mask for use by a passenger seated behind the seat assembly;

(d) oxygen flow conduit means interconnecting said oxygen canister and said oxygen mask compartment;

(e) cable means operatively connected by a first end to said firing pin mechanism of said oxygen generating canister and extending from said firing pin mechanism to said mask compartment; and (f) lever arm means positioned in said oxygen mask compartment to which a second end of said cable means is attached; said lever means also including tether means releasably connected by a first end thereof to said lever arm means and connected by a second end thereof to said mask, said lever arm means mounted in said mask compartment for pivotal movement between a non-activated position and an activated position in which the cable means activates the firing pin mechanism of the oxygen canister and the mask is released from a storage position into a use position for use by the passenger.

7. An aircraft passenger seat assembly according to claim 6, wherein said lever arm means comprises:

(a) a base mounted in said mask compartment;
(b) a pivot assembly carried by said base;
(c) a first lever arm mounted for pivotal movement on said pivot assembly with said cable means connected thereto; and
(d) a second lever arm mounted for pivotal movement on said pivot assembly in radially-spaced relation to said first lever arm and releasably carrying said tether means.

8. An aircraft passenger seat assembly according to claim 7, wherein said second lever arm includes a tether release pin hole therein, and said tether means includes a tether release pin for being releasably positioned in said tether release pin hole, said second lever arm being positioned on said base whereby in said non-activated position said tether release pin is retained therein and in said activated position said tether release pin is released from said tether release pin hole, thereby releasing the mask.

9. An aircraft passenger seat assembly according to claim 8, wherein said mask compartment includes three masks; two of said masks having a tether having a respective tether ring on one end thereof and said third mask has said tether release pin thereon, said tether rings adapted for being fitted over and received onto said tether release pin whereby movement of any one of the three masks pulls the lever means forward activating the oxygen canister and releasing all of the masks for use.

10. An aircraft passenger seat assembly according to claim 9, wherein said oxygen flow conduit means comprises:

(a) a three-to-one manifold connected to the oxygen discharge end of said oxygen canister;
(b) a single oxygen flow conduit extending from said three-to-one manifold to said mask compartment; and
(c) a one-to-three manifold positioned in said mask compartment, and first, second and third oxygen flow tubes interconnecting said one-to-three manifold and respective first, second and third masks.

* * * * *